United States Patent Office 3,280,147
Patented Oct. 18, 1966

3,280,147
PROCESS FOR PREPARING KETONES
George A. Olah, Sarnia, Ontario, Canada, assignor to The Dow Chemical Company, Midland, Mich., a corporation of Delaware
No Drawing. Filed Feb. 4, 1963, Ser. No. 256,112
16 Claims. (Cl. 260—332.3)

This application is a continuation-in-part of application Serial Number 207,788, filed July 5, 1962, now abandoned.

This invention relates to an improved process for preparing ketones. Specifically, the invention relates to a process for preparing ketones having the formula:

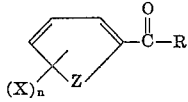

wherein R represents either a phenyl or an alkyl radical, X is either a halogen having an atomic number from 9 to 53 or an alkyl group, $n$ is an integer from 0 to 3, and Z represents either a chalkogen having an atomic number from 8 to 16 or the —C=C— radical. A preferred sub-genus is that wherein R represents either a phenyl or a lower alkyl group, X represents a halogen having an atomic number from 9 to 53 or a lower alkyl group, and $n$ is an integer from 0 to 3.

The term "lower alkyl" is used herein to denote an alkyl group containing from 1 to about 4 carbon atoms.

The novel process is conveniently practiced by reacting by contacting a cyclic compound having the formula:

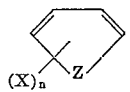

with a thiocarboxylic acid having the formula:

RCOSH or with an acyl sulfide having the formula

wherein R, X, Z, and $n$ each have the same significance as previously described, and in the presence of a Friedel-Crafts type catalyst. The thus-formed ketone is then easily separated from the reaction mixture by conventional procedures, such as by distillation.

The preferred temperature for the reaction will vary somewhat depending on the particular reactants being used. Generally, however, the temperature is maintained between about 0° and 120° C.

Friedel-Crafts type catalysts, in general, are operable in the novel process. Specific catalysts that have given excellent results include aluminum chloride, boron trifluoride, boron trifluoride-orthophosphoric acid, hydrogen fluoride and zinc chloride.

The reactants and catalysts are employed in proportions of 1 to about 10 moles of catalyst and 2 to about 5 moles of cyclic compound per mole of thiolcarboxylic acid or sulfide, preferably from 1 to 2 moles of catalyst and about 4 moles of cyclic compound per mole of acid or sulfide.

The process of the present invention possesses several advantages over that employing carboxylic acids. The novel process results in the formation of hydrogen sulfide as a by-product, which volatilizes readily and escapes from the system, unlike the known process where water is the by-product and tends to react with the catalyst. In addition, where metal halides are used as catalysts in the known process, large amounts of catalyst are frequently required due to halogenation of the acids to the corresponding acyl halides which then function as acylating agents.

Another important advantage of the present invention is that the yields are much improved over those obtained by the known process employing carboxylic acids or anhydrides. While carboxylic acids will effect C-acylation of cyclic compounds only with difficulty when Friedel-Crafts catalysts are employed, the thiolcarboxylic acids effect such C-acylation readily under these conditions. Also it is known that C-acylation of cyclic compounds with acid anhydrides results in the production of 1 mole mole of acylated cyclic compound and 1 mole of carboxylic acid per mole of anhydride. When, however, the acylation is effected with an acyl sulfide, there are produced 2 moles of acylated cyclic compound per mole of acyl sulfide, as illustrated by the equation:

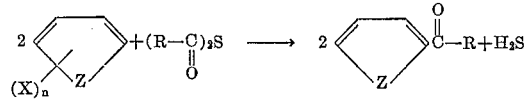

As is readily seen, this important difference in behavior of the acylsulfide leads to markedly improved yields over those obtained with the acid anhydride.

The practice of the present invention is illustrated by a series of experiments in each of which 2 moles of a cyclic compound and 0.5 mole of a thiolcarboxylic acid or of an acyl sulfide each of the respective genera previously described, were reacted in the presence of 1 mole of a Friedel-Crafts type catalyst. The reactions were run for a period of several hours, the product washed with water and separated by distillation and the yield calculated. There are shown in Table I for each experiment conducted, the thiolcarboxylic acid or acyl sulfide, cyclic compound, and catalyst used, the reaction temperature, and the yield of product obtained, based on the starting materials employed, and certain physical properties of the product.

TABLE I

| Exp. No. | Thiolcarboxylic Acid or Acyl Sulfide | Cyclic Compound | Catalyst | Reaction Temp., °C. | Product | | B.P. or M.P., °C. | Ref. Index |
|---|---|---|---|---|---|---|---|---|
| | | | | | Yield, Percent | Name | | |
| 1 | Thiolacetic Acid | Benzene | AlCl₃ | 50–80 | 41 | Acetophenone | B.P. 202 | $n_D^{20}=1.534$. |
| 2 | do | do | BF₃ | 50 | 34 | do | | |
| 3 | do | do | BF₃·H₃PO₄ | 35–50 | 40 | do | | |
| 4 | do | Toluene | AlCl₃ | 50 | 53 | 4-methyl acetophenone | B.P. 224 | |
| 5 | do | do | ZnCl₂ | 90 | 32 | do | | |
| 6 | do | do | HF | 0–15 | 23 | do | | |
| 7 | do | Ethylbenzene | AlCl₃ | 50 | 40 | 4-ethyl acetophenone | B.P. 236 | |
| 8 | do | Fluorobenzene | AlCl₃ | 85 | 37 | 4-fluoro acetophenone | B.P. 82–83°/12 mm. | $n_D^{25}=1.50$. |
| 9 | do | Chlorobenzene | AlCl₃ | 90 | 30 | 4-chloro acetophenone | B.P. 104–106°/10 mm. | |
| 10 | do | Bromobenzene | AlCl₃ | 90 | 30 | 4-bromo acetophenone | B.P. 132–134°/12 mm. | |

TABLE I—Continued

| Exp. No. | Thiolcarboxylic Acid or Acyl Sulfide | Cyclic Compound | Catalyst | Reaction Temp., °C | Yield, Percent | Name | B.P. or M.P., °C | Ref. Index |
|---|---|---|---|---|---|---|---|---|
| 11 | ----do---- | Iodobenzene | AlCl₃ | 90 | 34 | 4-iodo acetophenone | B.P. 142-144°/12 mm. | |
| 12 | Thiolpropionic Acid | Benzene | AlCl₃ | 78 | 38 | Propiophenone | B.P. 218° | |
| 13 | ----do---- | Toluene | AlCl₃ | 108 | 45 | 4-methyl propiophenone | | |
| 14 | ----do---- | Fluorobenzene | AlCl₃ | 85 | 31 | 4-fluoro propiophenone | B.P. 90-92°/12 mm. | $n_D^{20}=1.527$. |
| 15 | Thiolbenzoic Acid | Benzene | AlCl₃ | 78 | 56 | Benzophenone | M.P. 47-48° | |
| 16 | ----do---- | Toluene | AlCl₃ | 90 | 61 | 4-methyl benzophenone | M.P. 59-60° | |
| 17 | Diacetyl sulfide | Benzene | AlCl₃ | 50-80 | 78 | Acetophenone | B.P. 202 | $n_D^{20}=1.534$. |
| 18 | ----do---- | Toluene | AlCl₃ | 80 | 81 | 4-methyl acetophenone | B.P. 224 | |
| 19 | ----do---- | ----do---- | BF₃ | 0 | 47 | ----do---- | | |
| 20 | ----do---- | Ethylbenzene | AlCl₃ | 80 | 65 | 4-ethyl acetophenone | B.P. 236 | |
| 21 | ----do---- | Fluorobenzene | AlCl₃ | 85 | 61 | 4-fluoro acetophenone | 82-83/12 mm. | $n_D^{25}=1.508$. |
| 22 | ----do---- | Chlorobenzene | AlCl₃ | 100 | 57 | 4-chloro acetophenone | 104-106/10 mm. | |
| 23 | ----do---- | Thiophene | BF₃ | 20 | 80 | 2-acetyl thiophene | | |
| 24 | ----do---- | Furan | BF₃ | 0-10 | 46 | 2-acetyl furan | | |
| 25 | Dipropionyl sulfide | Benzene | AlCl₃ | 50-80 | 71 | Propiophenone | B.P. 218 | |
| 26 | ----do---- | Toluene | BF₃ | 0 | 58 | 4-methyl propiophenone | | $n_D^{20}=1.527$. |
| 27 | ----do---- | Fluorobenzene | AlCl₃ | 85 | 67 | 4-fluoro propiophenone | 90-92/12 mm. | |
| 28 | Dibenzoyl sulfide | Benzene | AlCl₃ | 80 | 81 | Benzophenone | M.P. 47-48 | |
| 29 | ----do---- | Toluene | AlCl₃ | 50 | 84 | 4-methyl benzophenone | M.P. 59-60 | |

In addition to those compounds specifically disclosed, other ketones within the scope of the present invention may be prepared from analogous cyclic compounds and analogous thiolcarboxylic acids or acyl sulfides, such as for example, 2,4-dichlorophenyl ethyl ketone,
2-chloro-3-fluorophenyl propyl ketone,
2-chloro-4-ethylphenyl ethyl ketone,
2-fluoro-4-n-propylphenyl n-butyl ketone,
2-fluoro-3-chloro-5-ethylphenyl sec-butylketone,
2,3-dimethyl-5-n-propylphenyl n-amyl ketone,
2,5-dibromophenyl ethyl ketone,
2-bromo-5-iodophenyl propyl ketone,
2-bromo-3-iodophenyl ethyl ketone,
2,4-diiodophenyl sec-butyl ketone,
2-chloro-4-iodophenyl n-hexyl ketone,
2-bromo-5-iodophenyl n-octyl ketone,
2-fluoro-4-bromophenyl n-nonyl ketone,
2-chloro-3-bromo-4-iodophenyl n-dodecyl ketone,
2,3-dibromophenyl n-tetradecyl ketone,
2-fluoro-4-iodophenyl n-hexadecyl ketone, and
2-bromo-3,4-diiodophenyl n-octadecyl ketone.

I claim:
1. An improved process for preparing ketones having the formula

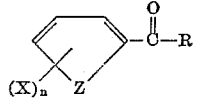

wherein R represents a member selected from the group consisting of phenyl and alkyl radicals, X represents a member selected from the group consisting of a halogen having an atomic number from 9 to 53 and alkyl groups, Z is a member selected from the group consisting of chalkogens having an atomic number from 8 to 16 and the —C=C— radical, and $n$ is an integer from 0 to 3, said process comprising reacting by contacting in the presence of a Friedel-Crafts catalyst a cyclic compound having the formula

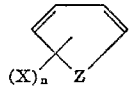

wherein X, $n$ and Z each have the same significance as previously described, with an acylating agent selected from the group consisting of thiolcarboxylic acids having the formula

RCOSH and acyl sulfides having the formula

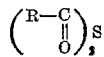

wherein R has the same significance as previously described.

2. A process as in claim 1 wherein one to about ten moles of catalyst and two to about 5 moles of the cyclic compound are employed per mole of the acylating agent.

3. A process as in claim 1 wherein 1 to 2 moles of catalyst and about 4 moles of the cyclic compound are employed per mole of the acylating agent.

4. A process as defined in claim 1 wherein R is an alkyl radical, $n$ is 0, Z is the radical —C=C— and the acylating agent is RCOSH.

5. A process as defined in claim 1, wherein R is an alkyl radical, $n$ is 0, Z is the radical —C=C— and the acylating agent is (RCO)₂S.

6. A process as defined in claim 1, wherein R and X are alkyl radicals, $n$ is 1, Z is the radical —C=C— and the acylating agent is RCOSH.

7. A process as defined in claim 1, wherein R is alkyl, X is halogen, $n$ is 1, Z is the radical —C=C— and the acylating agent is RCOSH.

8. A process as defined in claim 1, wherein R is phenyl, $n$ is 0, Z is the radical —C=C—, and the acylating agent is RCOSH.

9. A process as defined in claim 1, wherein R is phenyl, X is alkyl, $n$ is 1, Z is the radical —C=C— and the acylating agent is RCOSH.

10. A process as defined in claim 1, wherein R is alkyl, $n$ is 0, Z is the radical —C=C—, and the acylating agent is (RCO)₂S.

11. A process as defined in claim 1, wherein R and X are alkyl, $n$ is 1, Z is the radical —C=C—, and the acylating agent is (RCO)₂S.

12. A process as defined in claim 1, wherein R is alkyl, X is halogen, $n$ is 1, Z is the radical —C=C— and the acylating agent is (RCO)₂S.

13. A process as defined in claim 1, wherein R is alkyl, $n$ is 0, Z is the radical —S—, and the acylating agent is (RCO)₂S.

14. A process as defined in claim 1, wherein R is alkyl, $n$ is 0, Z is the radical —O—, and the acylating agent is (RCO)₂S.

15. A process as defined in claim 1, wherein R is phenyl, $n$ is 0, Z is the radical —C=C—, and the acylating agent is (RCO)₂S.

16. A process as defined in claim 1, wherein R is phenyl, X is alkyl, $n$ is 1, Z is the radical —C=C—, and the acylating agent is (RCO)₂S.

No references cited.

WALTER A. MODANCE, *Primary Examiner.*

JAMES A. PATTEN, *Assistant Examiner.*